US006275876B1

(12) United States Patent
Valk et al.

(10) Patent No.: US 6,275,876 B1
(45) Date of Patent: Aug. 14, 2001

(54) SPECIFYING WRAP REGISTER FOR STORING MEMORY ADDRESS TO STORE COMPLETION STATUS OF INSTRUCTION TO EXTERNAL DEVICE

(75) Inventors: Kenneth Michael Valk; Thomas Rembert Sand; Ronald Edward Fuhs, all of Rochester; Gregory Michael Nordstrom, Oronoco; Bruce Leroy Beukema, Hayfield, all of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,243

(22) Filed: May 21, 1999

(51) Int. Cl.[7] ...................................... G06F 13/12
(52) U.S. Cl. .................. 710/19; 710/6; 710/59; 712/214
(58) Field of Search .................. 710/6, 19, 59; 712/214

(56) References Cited

U.S. PATENT DOCUMENTS 4,535,404 * 8/1985 Shenk ..................................... 710/59
5,504,869 * 4/1996 Uchida ................................. 712/214
5,603,066 * 2/1997 Krakirian .............................. 710/74
5,678,062 * 10/1997 Okada et al. .......................... 710/22
5,809,333 * 9/1998 Story et al. ............................ 710/22
6,199,187 * 3/2001 Tamura et al. ....................... 714/763

* cited by examiner

Primary Examiner—Kenneth S. Kim
(74) Attorney, Agent, or Firm—Tyler L. Nasiedlak; Erik G. Swenson (57) ABSTRACT

A computing system includes a processing system, at least a first register, and a control system. The processing system generates a first instruction set and a first address for storing a first completion status for the first instruction set. The first register receives the first address from the processing system. The control system communicates the first instruction set received from the processing system to an external device. The control system receives the first completion status from the external device, accesses the first register to determine the first address for the first instruction set, and stores the first completion status in the determined first address.

23 Claims, 5 Drawing Sheets

SPECIFYING WRAP REGISTER FOR STORING MEMORY ADDRESS TO STORE COMPLETION STATUS OF INSTRUCTION TO EXTERNAL DEVICE

FIELD OF THE INVENTION

The present invention generally relates to computer architectures, and more particularly to a system and method for storing the status of an operation in memory.

BACKGROUND OF THE INVENTION

Computing systems typically include a processor and a memory associated with the processor. Often, the computing systems are electrically connected to external devices, such as disk drives, scanners, or monitors. The computing system usually includes a software program containing numerous commands. The processor executes the commands from the software program. In some applications, the software program uses programmed input/output (PIO) instructions via the processor to communicate with the external devices. The software program issues a first PIO instruction to the processor to communicate with a first external device. PIO instructions are typically characterized as synchronous. By the term "synchronous," it is meant that the processor does not proceed to a second PIO instruction issued by the software program until the first PIO instruction has been completed and an associated completion status signal is transmitted to the processor that issued the first PIO instruction.

In some applications, the use of PIO instructions is advantageous because the software program receives immediate feedback of whether the desired operation with the external device was completed successfully; however, PIO instructions have disadvantages. One such disadvantage is that PIO instructions often result in degraded processor performance because the total length of time it takes to deliver, execute, and transmit a completion status signal for the overall operation is time consuming. This performance degradation increases as the processor speed increases and as the external devices are placed in physical enclosures that are located remotely from the system processor.

Another method used by software programs to communicate with external devices is by issuing memory mapped input/output (MMIO) instructions. As MMIO instruction is an instruction that the processor uses to access the main memory. The processor typically does not distinguish between MMIO instructions to external devices and MMIO instructions to main memory. MMIO instructions are asynchronous. By the term "asynchronous," it is meant that the processor executes a second sequential MMIO instruction without waiting for an associated completion status signal from the external device being delivered back to the system processor for the first MMIO instruction. Thus, where data flows only from the processor to the external device, the processor does not wait for a return completion status signal, and communication with the external device does not have a negative impact on the processor's performance.

MMIO instructions also have disadvantages. One disadvantage of MMIO instructions is that the software program does not receive feedback on the status of the operation from the external device. This may lead to unrecoverable errors or undetected data loss. To overcome this disadvantage, in some applications, the completion status of an MMIO instruction is determined by reading a status register in an input/output bus controller or in the external device itself. Reading a status register in the input/output bus controller or in the external device also comes with problems. The processor must wait for the read operation to complete and must typically wait for the completion of previous MMIO instructions. Thus, the processor typically stops execution of subsequent MMIO instructions until the read operation and the previous MMIO instruction are completed. Thus, reading a status register negates the advantage of MMIO instructions and degrades processor performance similar to PIO instructions.

Therefore, improvements in the execution of input/output instructions are desirable.

SUMMARY OF THE INVENTION

In one aspect of the present invention, one example embodiment involves a computing system including a processing system, at least a first register, and a control system. The processing system generates a first instruction set and a first address for storing a first completion status for the first instruction set. The first register receives the first address from the processing system. The control system communicates the first instruction set received from the processing system to an external device. The control system receives the first completion status from the external device, accesses the first register to determine the first address for the first instruction set, and stores the first completion status in the determined first address.

In another aspect of the present invention a method of storing completion statuses in described. The method includes generating a first instruction set and a first address for storing a first completion status for the first instruction set; receiving the first address from a processing system in a first register; communicating the first instruction set received from the processing system to an external device; receiving the first completion status from the external device; accessing the first register to determine the first address for the first instruction set; and storing the first completion status in the determined first address.

The above summary of principles of the disclosure is not intended to describe each illustrated embodiment or every implementation of the present disclosure. The figures and the detailed description that follow more particularly exemplify certain preferred embodiments utilizing the principles disclosed herein.

BRIEF DESCRIPTION OF THE DRAWINGS

Principles of the invention may be more completely understood in consideration of the detailed description of various embodiments of the invention that follows in connection with the accompanying drawings in which.

While principles of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION OF THE PREFERRED EMBODIMENTS

The principles described herein are believed to be applicable to a variety of computer architectures. The principles of the disclosure have been found to be particularly advantageous for storing the status of an operation in memory. An appreciation of various aspects is best gained through a discussion of an application example for such a computer architecture.

Figure 1:
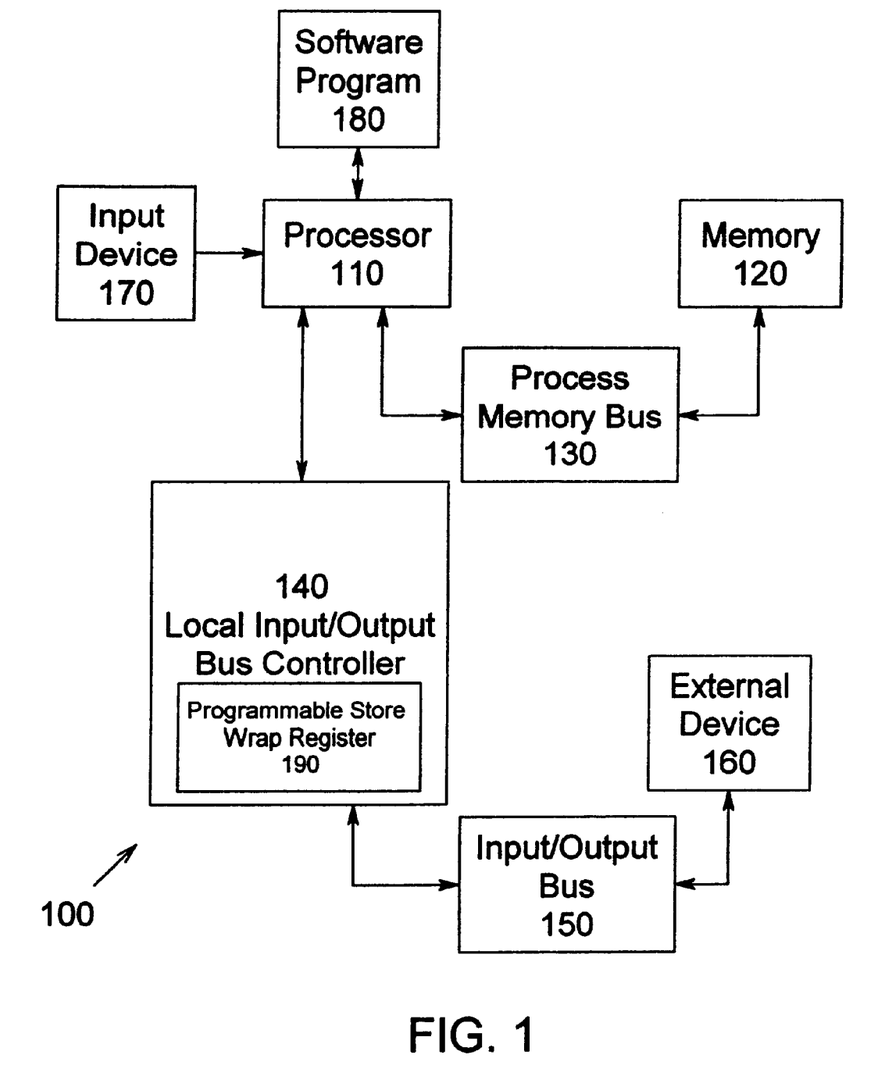
FIG. 1 is a block diagram of a computing system for storing the status of an operation in memory, according to an example embodiment of the present invention.

Attention is directed to FIG. 1. FIG. 1 is a block diagram of one particular embodiment of a computing system 100. In one example embodiment, the computing system 100 includes a processor 110, a memory 120, and a processor/memory bus 130. The processor 110 and the memory 120 electrically communicate via the processor/memory bus 130. In other words, the processor/memory bus 130 operates as a communication channel between the processor 110 and the memory 120. The processor 110 performs arithmetic and logical operations and decodes and executes instructions.

Typically, the processor/memory bus 130 includes an address bus and a data bus. The memory 120 includes a plurality of memory locations for storing data that is being actively worked on. Each memory location within the memory 120 has a memory address. These memory addresses are sent through the address bus of the processor/memory bus 130 to signal a memory address location in the memory 120, and the data is transferred over the data bus of the processor/memory bus 130 to that memory address in the memory 120.

In alternative embodiments, the computing system 100 may include any number of processors, memories, and buses.

The processor 110 may be a conventional processor that executes instructions received from an input device 170, such as a keyboard or mouse, or a software program 180. The software program 180 contains a set of instructions that are loaded onto the processor 110. The software program 180 commands the computing system 100 to perform various operations, such as modifying the memory 120, displaying graphics on an output device, and the like, on, for example, data contained in the program and stored in the memory 120 or data supplied by a user through the input device 170. The memory 120 may, for example, be a conventional random access memory (RAM) and controller. Likewise, the process/memory bus 130 may, for example, be a conventional bus.

In one example embodiment, the computing system 100 also includes a local input/output bus controller 140 and an input/output bus 150. By the term "local," it is meant that the input/output bus controller 140 is physically connected to the processor 110. In an alternative embodiment, the input/output bus controller 140 is remote. By the term "remote," it is meant that the input/output bus controller 140 is physically separated from the processor 110. In this embodiment, the input/output bus controller 140 may be connected to the processor 110 via a copper or fiber optic cable. In either embodiment, the processor 110 electrically communicates with the local input/output bus controller 140. The local input/output bus controller 140 electrically communicates with the input/output bus 150. The input/output bus 150 may, for example, be a conventional input/output bus.

In some applications, the computing system 100 electrically communicates with an external device 160, such as a scanner, monitor, or printer, via the input/output bus 150 and the local input/output bus controller 140. The input/output bus 150 operates as a communication channel between the local input/output bus controller 140 and the external device 160. The local input/output bus controller 140 controls the input/output bus 150 through instructions received from the processor 110.

Figure 2:
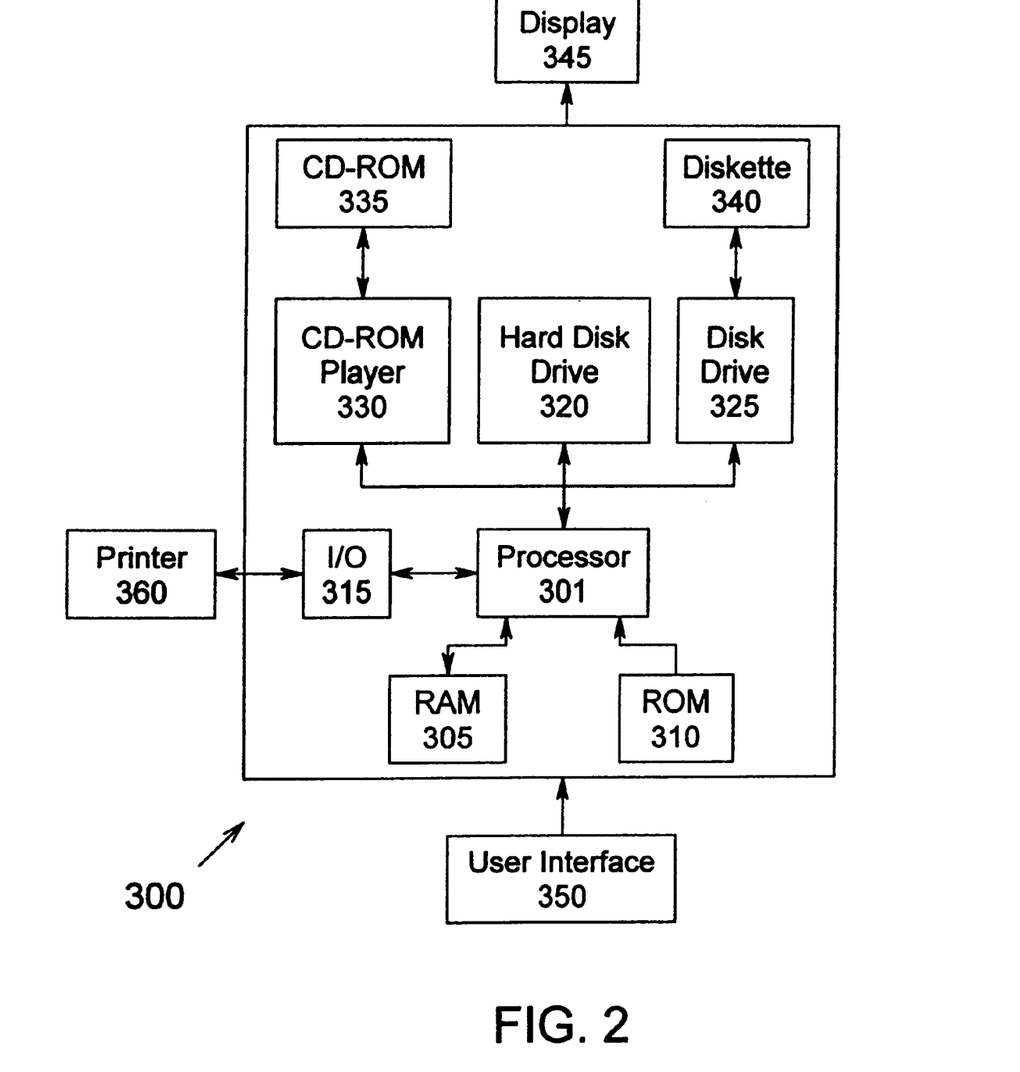
FIG. 2 is a block diagram of another example computing system, according to an example embodiment of the present invention.

Attention is directed to FIG. 2. FIG. 2 is a block diagram of another example computing system 300 capable of executing programming functions of a software program. The computing system 300, such as a personal computer, client computer, workstation, mid or mainframe computer, server, etc., typically includes a central processor (CPU) 301 coupled to random access memory (RAM) 305 and read-only memory (ROM) 310. The CPU 301 electrically communicates with other internal and external components through input/output (I/O) circuitry and bussing 315. The computing system 300 may also include one or more data storage devices, including hard 320 and floppy disk drives 325 and a CD-ROM drive 330.

In one embodiment, software containing a program or database may be stored and distributed on a CD-ROM 335, or a diskette 340, which may be inserted into, and read by, the CD-ROM drive 330 or the disk drive 325, respectively. The computing system 300 is also coupled to a display 345, a user interface 350, such as a mouse and keyboard, and a printer 360. The user typically inputs, modifies, and executes the various program routines of the software program by interfacing with the computing system 300 through the user interface 350 and the display 355.

Figure 3:
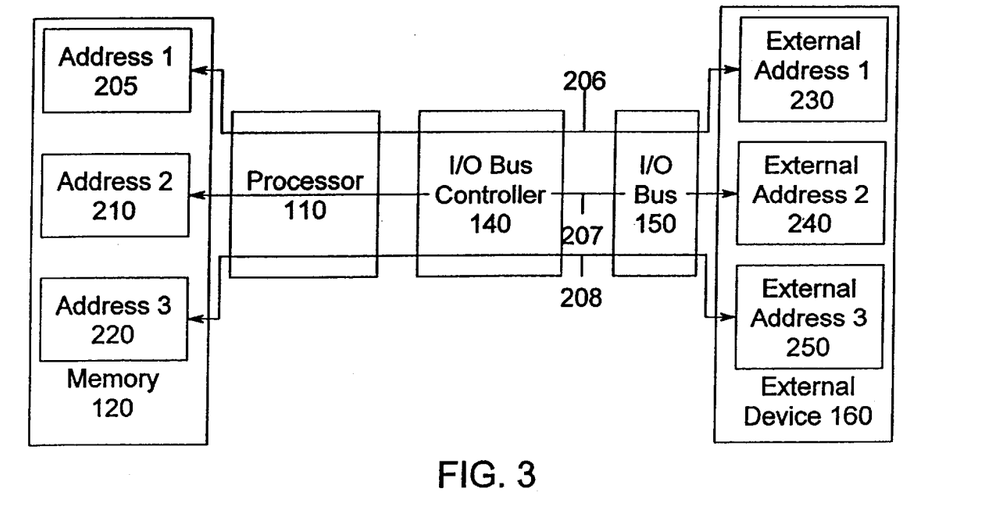
FIG. 3 is a block diagram of example MMIO instructions of the computing system of FIG. 1, according to an example embodiment of the present invention.

Attention is directed to FIG. 3. FIG. 3 is a block diagram of example MMIO instructions of the computing system 100 of FIG. 1. In one example embodiment, the software program 180 (FIG. 1) uses memory mapped input/output (MMIO) instructions 206, 207, 208 to communicate with the external device 160. By the term "NMIO," it is meant that each byte of data, contained in first, second, and third external addresses 230, 240, 250 in the external device 160, correspond to the data contained in first, second, and third memory addresses 205, 210, 220, respectively, in the memory 120. In alternative embodiments, the computing system 100 may have any number of addresses in the external device and the memory 120. In another alternative embodiment, the MMIOs may be targeted to address space within an I/O Bus Controller.

In an output MMIO instruction from the processor 110, the data in the first external address 230 of the external device 160 is mapped directly to the first memory address 205 of the memory 120 via the first MMIO instruction 206, such that when the data in the first memory address 205 of the memory 120 changes, the data in the first external address 230 of the external device 160 changes correspondingly. Likewise, the data in the second and third external addresses 240, 250 of the external device 160 are mapped directly to the second and third memory addresses 210, 220, respectively, of the memory 120 via the second and third MMIO instructions 207, 208, respectively.

For example, each pixel, such as the first external address 230, of a computer monitor, acting as the external device 160, is mapped to a specific memory address, such as the first memory address 205, in the memory 120. When the data in the specific memory address changes, the pixel changes correspondingly. The processor 110 modifies the data contained within the first memory address 205 in response to instructions received from the software program 180 (FIG. 1). The processor 110 communicates the change in data contained within the first memory address 205 to the first external address 230 of the external device 160 through the input/output bus controller 140 and the input/output bus 150. Thus, as the software program 180 manipulates the data contained in the memory 120, the monitor reflects the changed data, correspondingly.

In an input MMIO instruction from the software program 180 (FIG. 1), the data in the first memory address 205 of the memory 120 is mapped directly to the first external address 230 of the external device 160 via the first MMIO instruction 206, such that when the first external address 230 of the external device 160 changes, the data in the first memory address 205 of the memory 120 changes correspondingly. Likewise, the data in the second and third memory addresses 210, 220 of the memory 120 are mapped directly to the second and third external addresses 240, 250, respectively, of the external device 160 via second and third MMIO instructions 207, 208, respectively.

Referring back to FIG. 1, the computing system 100 further includes a programmable store wrap register 190. In one example embodiment, the programmable store wrap register 190 is located within the local input/output bus controller 140. In an alternative embodiment, the programmable store wrap register 190 is located within the external device 160. In other alternative embodiments, the computing system 100 may include more than one programmable store wrap register.

The local input/output bus controller 140 collects a completion status of a previous MMIO instruction, such as the first MMIO instruction 206 of FIG. 3. The software program 180 causes the processor 110 to write a first memory address to the programmable store wrap register 190. The local input/output bus controller 140 writes the completion status received from the external device 160 corresponding to the first MMIO instruction 206 to the first memory address in the memory 120 stored within the programmable store wrap register 190.

The local input/output bus controller 140 collects a completion status of a second previous MMIO instruction, such as the second MMIO instruction 207 of FIG. 3. The software program 180 causes the processor 110 to write a second memory address to the programmable store wrap register 190. The local input/output bus controller 140 writes the completion status received from the external device 160 corresponding to the second MMIO instruction 207 to the second memory address in the memory 120 stored within the programmable store wrap register 190.

The local input/output bus controller 140 collects a completion status of a third previous MMIO instruction, such as the third MMIO instruction 208 of FIG. 3. The software program 180 causes the processor 110 to write a third memory address to the programmable store wrap register 190. The local input/output bus controller 140 writes the completion status received from the external device 160 corresponding to the third MMIO instruction 208 to the third memory address in the memory 120 stored within the programmable store wrap register 190.

In alternative embodiments, a single memory address may be used for storing multiple completion statuses. In these embodiments, the processor 110 clears the memory location prior to each completion status being stored to that memory location. In other alternative embodiments, the memory address is not limited to the memory 120. The address could specify any addressable element in the computing system 100. For example, the address could specify an internal processor register or address a device on another input/output bus.

Figure 4:
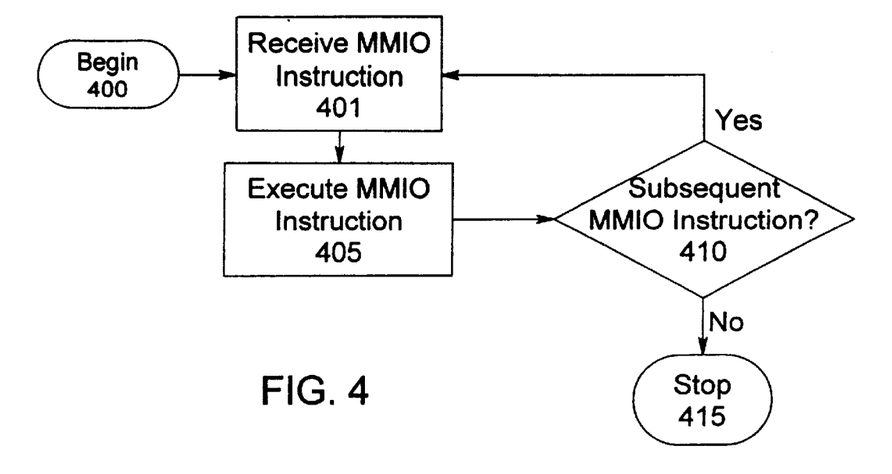
FIG. 4 is a flow diagram illustrating the operation of the asynchronous MMIO instructions of FIG. 3, according to an example embodiment of the present invention.

Attention is directed to FIG. 4. FIG. 4 is a flow diagram illustrating the operation of the asynchronous MMIO instructions of FIG. 3. In one example embodiment, at block 401, a software program sends a MMIO instruction to a processor. At block 405, the processor executes the MMIO instruction. At block 410, the computing system determines if there is a subsequent MMIO instruction. If there is a subsequent MMIO instruction, flow of the process returns to block 401. If there is not a subsequent MMIO instruction, the input/output process stops at block 415.

The processor asynchronously executes the subsequent MMIO instructions without waiting for an associated completion status from an external device in response to previous MMIO instructions. In this fashion, the processor continues to execute sequential MMIO instructions without interrupting to wait for associated completion statuses signals to be returned from the external device in response to previous MMIO instructions. This eliminates the processor degradation associated with PIO instructions.

Figure 5:
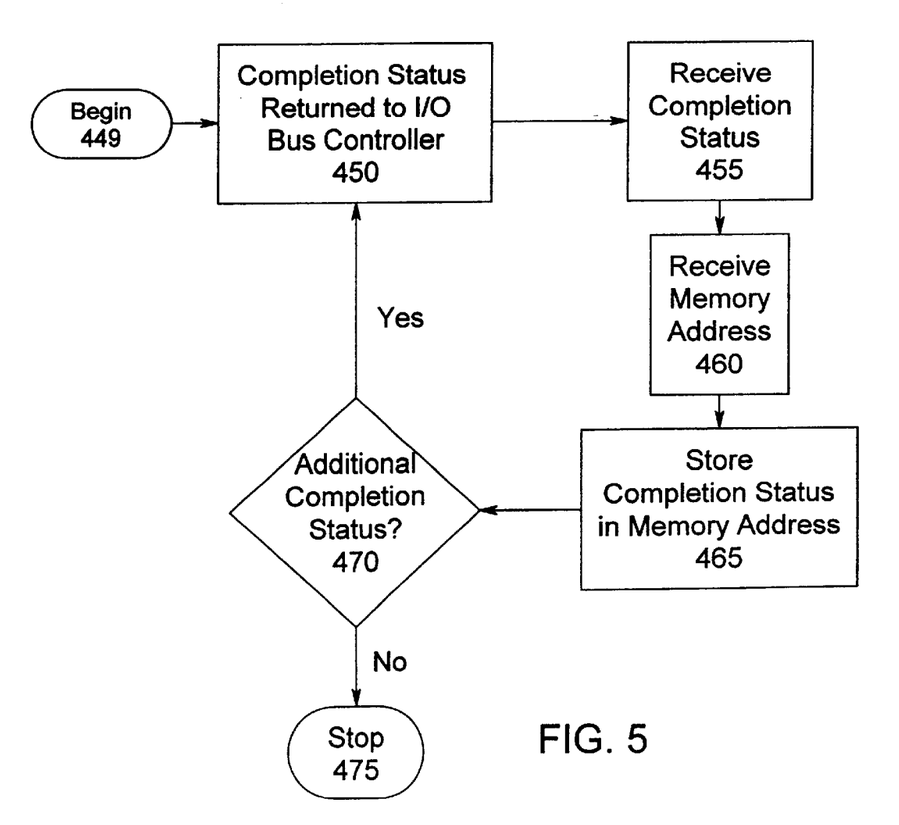
FIG. 5 is a flow diagram illustrating the operation of an input/output controller with a store wrap register, according to an example embodiment of the present invention.

Attention is directed to FIG. 5. FIG. 5 is a flow diagram illustrating the operation of a local input/output controller with a programmable store wrap register. In one example embodiment, after completion of a MMIO instruction, an external device returns a completion status to the input/output bus controller at block 450.

The completion status communicates to the computing system the status of the MMIO instruction. For example, an error message may be sent communicating to the computing system that the data was not received. At block 455, the input/output bus controller receives the completion status from the external device. At block 460, the processor writes a memory address to the programmable store wrap register. At block 465, the input/output bus controller stores the completion status in the memory address in the memory stored within the programmable store wrap register. At block 470, the computing system determines if there is an additional completion status to be received from the external device. If there is an additional completion status, flow of the process returns to block 450. If there is not an additional completion status, the completion status process stops at block 475.

Referring back to FIG. 1, with the completion statuses of each MMIO instruction stored in the memory 120, the software program 180 causes the processor to read the completion statuses by performing a read from the memory 120. Reading data from the memory 120 is faster than reading data from the input/output bus controller 140 or the external device 160. Therefore, the reading of the completion statuses has minimal effect on performance of the overall computing system 100.

Figure 6:
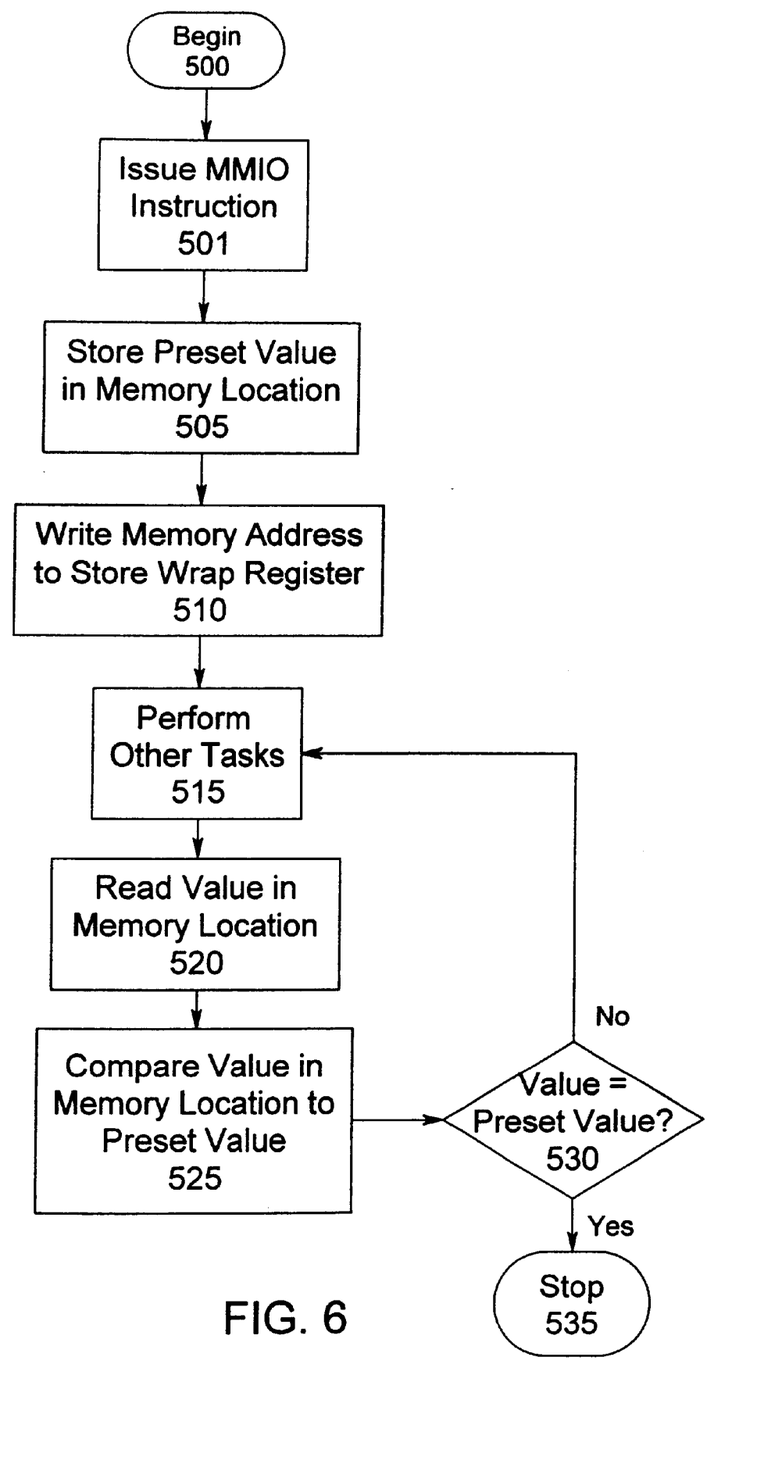
FIG. 6 is a flow diagram illustrating a computing system's use of a store wrap register, according to an example embodiment of the present invention.

Attention is directed to FIG. 6. FIG. 6 is a flow diagram illustrating a computing system's use of a programmable store wrap register. In one example embodiment, at block 501, a software program issues a MMIO instruction to a processor. At block 505, the software program causes the processor to write a preset value in a memory location in a memory. By the term "preset," it is meant that the processor stores a value into the memory location that is different from any possible completion status value that may later be written to that location by an input/output bus controller. This preset value is called the "Operation Pending Value."

At block 510, the software program causes the processor to write the memory address to store the completion status to a programmable store wrap register. At block 515, the software performs other tasks. At block 520, after the software program communicates the memory address to the input/output bus controller, the software program causes the processor to read the value in the memory address. At block 525, the software program causes the processor to compare the value in the memory location to the preset value. At block 530, the software program causes the processor to determine if the value returned is equal to the preset value. If the value returned from that memory address is still the "Operation Pending Value," then the software program causes the processor to determine that the operation is not complete and therefore the status of the MMIO instruction is not available. Flow returns to block 515. If the value returned from the memory address is not the "Operation Pending Value," then the software program causes the processor to determine that the operation is completed and the process is stopped at block 535.

In an alternative embodiment, the processor only reads the value of the completion status of a prior issued MMIO instruction when the processor prepares to send a subsequent MMIO instruction. This situation is typical of an operating system that communicates with an external device via MMIO instructions and verifies the successful completion of the MMIO instruction only when it prepares to send a subsequent MMIO instruction to the external device.

In another alternative embodiment, the software program may specify different memory locations each time the store wrap register is used. The processor could issue a series of MMIO instructions without waiting for completion of each individual operation. In this embodiment, the processor sends the store wrap register a different memory address for each MMIO instruction. By using this method, the processor can determine exactly where in a series of MMIO instructions, a failure occurred.

In yet another alternative embodiment, multiple store wrap registers may be used. This would allow multiple software programs to monitor the completion status of their respective MMIO instructions independent of the other software programs, thus reducing the processor overhead required to communicate with an external device. Multiple software programs may also use a single store wrap register to monitor the completion status of their respective MMIO instructions independent of the other software programs.

Referring back to FIG. 1, by the use of the store wrap register 190, the computing system 100 can obtain significant advantages. For example, the input/output process may proceed in an asynchronous manner, allowing the processor 110 to operate at peak efficiency. The processor 110 may, for example, continue to execute subsequent MMIO instructions without waiting for return completion status signals form the external device 160. By the use of the store wrap register 190, the computing system 100 can, for instance, receive feedback of the input/output process, allowing the computing system 100 to correct errors and resend lost data.

The above specification and examples are believed to provide a complete description of the manufacture and use of particular embodiments of the invention. Many embodiments of the invention can be made without departing from the spirit and scope of the invention.

What is claimed is:

1. A computing system comprising:
   a processing system for generating a first instruction set and a first address for storing a first completion status for the first instruction set;
   at least a first register for receiving the first address from the processing system; and
   a control system for communicating the first instruction set received from the processing system to an external device;
       wherein the control system receives the first completion status from the external device, accesses the first register to determine the first address for the first instruction set, and stores the first completion status in the determined first address.

2. A computing system according to claim 1 wherein the processing system includes a first processor for generating the first instruction set and the first address for storing the first completion status for the first instruction set.

3. A computing system according to claim 2 wherein the first processor generates a second instruction set and a second address for storing a second completion status of the second instruction set irregardless of the receipt of the first completion status.

4. A computing system according to claim 3 wherein the control system receives the second instruction set and communicates the second instruction set to the external device irregardless of the receipt of the first completion status.

5. A computing system according to claim 3 wherein the first register receives the second address irregardless of the receipt of the first completion status.

6. A computing system according to claim 5 wherein the control system rewrites a storage location of the first register containing the first address after receiving and storing the first completion status.

7. A computing system according to claim 1 wherein the processing system writes an initial value to the first address prior to sending the first instruction set to the control system and reads the first address after sending the first instruction set to determine the first completion status.

8. A computing system according to claim 7 wherein the processing system rereads the first address if the value in the first address is different than the initial value.

9. A computing system according to claim 2 further including a second processor, wherein the second processor generates a second instruction set and a second address for storing a second completion status, and wherein the control system receives the second instruction set irregardless of the receipt of the first instruction set.

10. A computing system according to claim 1 wherein the processing system includes a plurality of processors each configured to generate instruction sets and addresses for storing completion statuses for the instruction sets.

11. A computing system according to claim 10 wherein the first register receives a plurality of addresses from the plurality of processors.

12. A computing system according to claim 1 wherein the control system includes at least a first input/output bus controller for communicating the first instruction set received from the processing system to an external device.

13. A computing system according to claim 12 wherein the control system includes a plurality of input/output bus controllers each communicating instruction sets received from the processing system to associated external devices.

14. A computing system according to claim 1 further including a memory arrangement coupled to the control system, wherein the first address for storing the first completion status is a memory address of the memory arrangement.

15. A computing system according to claim 14 wherein the memory arrangement is a random access memory device.

16. A computing system according to claim 1 further including one or more second registers each configured and arranged to receive an address from the processing system for storing completion statuses.

17. A method of storing completion statuses comprising:

generating a first instruction set and a first address for storing a first completion status for the first instruction set;

receiving the first address from a processing system in a first register;

communicating the first instruction set received from the processing system to an external device;

receiving the first completion status from the external device;

accessing the first register to determine the first address for the first instruction set; and storing the first completion status in the determined first address.

18. A method according to claim 17 further comprising:

generating a second instruction set and a second address for storing a second completion status of the second instruction set irregardless of the receipt of the first completion status;

receiving the second instruction set; and communicating the second instruction set to the external device irregardless of the receipt of the first completion status.

19. A method according to claim 18 further comprising:

receiving the second address from the processing system in the first register irregardless of the receipt of the first completion status.

20. A method according to claim 17 further comprising:

rewriting a storage location of the first register containing the first address after receiving and storing the first completion status.

21. A method according to claim 17 further comprising:

writing an initial value to the first address prior to sending the first instruction set; and reading the first address after sending the first instruction set to determine the first completion status.

22. A method according to claim 21 further comprising:

rereading the first address if the value in the first address is different than the initial value.

23. A computing system comprising:

means for generating a first instruction set and a first address for storing a first completion status for the first instruction set;

means for receiving the first address from the generating means; and means for communicating the first instruction set received from the generating means to an external device;

wherein the communicating means receives the first completion status from the external device, accesses the receiving means to determine the first address for the first instruction set, and stores the first completion status in the determined first address.

* * * * *